US011452148B2

(12) United States Patent
Casati et al.

(10) Patent No.: US 11,452,148 B2
(45) Date of Patent: Sep. 20, 2022

(54) SUPPORT OF DATA TRANSMISSION IN A PACKET MOBILE NETWORK

(71) Applicant: Alcatel Lucent, Boulogne Billancourt (FR)

(72) Inventors: Alessio Casati, West Molesey (GB); Bruno Landais, Lannion (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/412,414

(22) PCT Filed: Jun. 28, 2013

(86) PCT No.: PCT/EP2013/063736
§ 371 (c)(1),
(2) Date: Dec. 31, 2014

(87) PCT Pub. No.: WO2014/005956
PCT Pub. Date: Jan. 9, 2014

(65) Prior Publication Data
US 2015/0215978 A1      Jul. 30, 2015

(30) Foreign Application Priority Data

Jul. 2, 2012   (EP) .................................... 12290218

(51) Int. Cl.
*H04W 76/11*     (2018.01)
*H04W 76/12*     (2018.01)
*H04W 80/04*     (2009.01)

(52) U.S. Cl.
CPC ............ *H04W 76/11* (2018.02); *H04W 76/12* (2018.02); *H04W 80/04* (2013.01)

(58) Field of Classification Search
CPC ............. H04W 72/04; H04W 74/0833; H04W 76/022; H04W 80/04; H04W 68/025; H04W 76/11; H04W 76/12
See application file for complete search history.

(56) References Cited

U.S. PATENT DOCUMENTS 7,558,240 B2   7/2009  Chen et al.
8,937,905 B2   1/2015  Nakatsugawa
(Continued)

FOREIGN PATENT DOCUMENTS

CN    102415199 A    4/2012
EP     2442514 A1    4/2012
(Continued)

OTHER PUBLICATIONS

"$3^{rd}$ Generation Partnership Project; Technical Specification Group Core Network and Terminals; General Packet Radio System (GPRS) Tunnelling Protocol User Plane (GTPv1-U) (Release 11)," 3GPP TS 29.281, No. V11.3.0, pp. 1-26, XP050580762, Jun. 2012.
(Continued)

*Primary Examiner* — Benjamin H Elliott, IV
(74) *Attorney, Agent, or Firm* — Fay Sharpe LLP

(57) ABSTRACT

In an embodiment, there is provided a method for the support of data transmission in a packet mobile network, for PDN connectivity over the packet mobile network between an User Equipment UE and an external Packet Data Network PDN, the packet mobile network comprising a Core Network CN accessed by a Radio Access Network RAN, the data transmission using a tunnel over an interface between a serving RAN node and a serving user plane CN node, the method including support of the data transmission in a mode referred to as connectionless transmission mode, wherein the tunnel over the interface is predefined and identified using information referred to as Connection ID information, providing a reference to the PDN and to the serving user plane CN node.

19 Claims, 10 Drawing Sheets

(56) References Cited

U.S. PATENT DOCUMENTS

| | | | |
|---|---|---|---|
| 9,769,852 B2 | 9/2017 | Turanyi et al. | |
| 2009/0270099 A1* | 10/2009 | Gallagher | H04W 8/08 455/435.1 |
| 2011/0085497 A1* | 4/2011 | Fang | H04W 48/16 370/328 |
| 2011/0170517 A1* | 7/2011 | Bakker | H04W 36/125 370/331 |
| 2012/0044949 A1* | 2/2012 | Velev | H04W 8/082 370/401 |
| 2012/0082073 A1* | 4/2012 | Andreasen | H04L 12/4633 370/310 |
| 2012/0142313 A1* | 6/2012 | Edge | H04W 64/003 455/410 |
| 2012/0142371 A1 | 6/2012 | Park et al. | |
| 2012/0155391 A1 | 6/2012 | Kim et al. | |
| 2012/0208545 A1* | 8/2012 | Yang | H04W 74/002 455/450 |
| 2012/0281566 A1* | 11/2012 | Pelletier | H04W 76/046 370/252 |
| 2013/0301611 A1* | 11/2013 | Baghel | H04W 72/04 370/331 |
| 2014/0038622 A1* | 2/2014 | Zhu | H04W 72/02 455/450 |
| 2014/0079049 A1* | 3/2014 | Friman | H04L 63/306 370/338 |

FOREIGN PATENT DOCUMENTS

| | | |
|---|---|---|
| GB | 2 399 716 A | 9/2004 |
| JP | 2006-522518 | 9/2006 |
| JP | 2012-124897 A | 6/2012 |
| JP | 2015-517758 | 6/2015 |
| WO | WO 2011/055437 A1 | 5/2011 |
| WO | WO 2011/060707 A1 | 5/2011 |
| WO | WO 2011/116849 A1 | 9/2011 |
| WO | WO 2012/041363 A1 | 4/2012 |
| WO | WO 2012/048290 A1 | 4/2012 |
| WO | WO 2013/169073 | 11/2013 |

OTHER PUBLICATIONS $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 11), 3GPP TS 23.401, No. v11.2.0, pp. 1-285, XP050580724, Jun. 2012.

International Search Report for PCT/EP2013/063736 dated Aug. 8, 2013.

"Connectionless Data Transmission," Alcatel Lucent, S2-122938, 3GPP SA WG2 #92, Jul. 3, 2012, pp. 1-3.

3GPP; Technical Specification Group Services and System Aspects; Machine-Type and other Mobile Data Applications Communications Enhancements, 3GPP TR 23.887, Jun. 2013.

Huawei, PDN Connection ID handling in 23.402, $3^{rd}$ Generation Partnership Project (3GPP), S2-085642, 3GPP TSG SA WG2 Meeting #67, 23 pages, Sophia Antipolis, France, Aug. 25-29, 2008.

"$3^{rd}$ Generation Partnership Project; Technical Specification Group Radio Access Network; UTRAN Iu interface Radio Access Network Application Part (RANAP) signaling (Release 10)," 3GPP TS 25.413 V10.5.0, 428 pages, (Mar. 2012).

$3^{rd}$ Generation Partnership Project; Technical Specification Group Core Network and Terminals; General Packet Radio Service (GPRS); GPRS Tunnelling Protocol (GTP) across the Gn and Gp interface (Release 11), 3GPP TS 29.060 V11.2.0, 172 pages, (Mar. 2012).

$3^{rd}$ Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 10), 3GPP TS 29.274 V10.6.0, 203 pages, (Mar. 2012).

$3^{rd}$ Generation Partnership Project; Technical Specification Group Radio Access Network; Evolved Universal Terrestrial Radio Access Network (E-UTRAN); S1 Application Protocol (S1AP) (Release 10), 3GPP TS 36.413 V10.5.0 (Mar. 2012).

* cited by examiner

SUPPORT OF DATA TRANSMISSION IN A PACKET MOBILE NETWORK

The present invention generally relates to mobile communication networks and systems.

Detailed descriptions of mobile communication networks and systems can be found in the literature, such as in particular in Technical Specifications published by standardization bodies such as for example 3GPP (3$^{rd}$ Generation Partnership Project).

Examples of packet mobile communication systems include EPS (Evolved Packet System), GPRS/UMTS, . . . etc.

EPS network, for example, comprises a Core Network called EPC (Evolved Packet Core) that can be accessed by a Radio Access Network RAN called E-UTRAN. An example of architecture of EPS network is recalled in FIG. 1 (taken from 3GPP TS 23.401), showing the main network nodes and interfaces between network nodes.

An PDN connection (such as IP connection) can be established over an EPS network, between an User Equipment UE and an external Packet Data Network PDN (such as IP network). Traffic for a PDN connection in EPS network is supported based on the concepts of bearers (or allocated network resources for said traffic all over the network and over different interfaces of the network). Procedures are defined for managing such bearers over different interfaces of the network and associated contexts in different nodes of the network. There are similar concepts in systems other than EPS, for example GPRS/UMTS.

As recognized by the inventors and as will be explained later with more detail, there is a need to reduce signaling generated by such procedures and the amount of associated contexts in network nodes, in particular for new types of communications such as for example Machine Type Communication MTC (also called Machine-to-Machine M2M). More generally, networks and systems improvements are needed due to the specific nature of new types of communications such as for example MTC.

Embodiments of the present invention in particular address such needs.

These and other objects are achieved, in one aspect, by a method for the support of data transmission in a packet mobile network, for PDN connectivity over said packet mobile network between an User Equipment UE and an external Packet Data Network PDN, said packet mobile network comprising a Core Network CN accessed by a Radio Access Network RAN, said data transmission using a tunnel over an interface between a serving RAN node and a serving user plane CN node, said method including support of said data transmission in a mode referred to as connectionless transmission mode, wherein said tunnel over said interface is predefined and identified using information referred to as Connection ID information, providing a reference to said PDN and to said serving user plane CN node.

These and other objects are achieved, in another aspect, by a method for the support of data transmission in a packet mobile network, for PDN connectivity over said packet mobile network between an User Equipment UE and an external Packet Data Network PDN, said data transmission using a logical traffic channel over a radio interface between said UE and said packet mobile network, said method including support of said data transmission in a mode referred to as connectionless transmission mode, wherein said logical traffic channel is predefined for said PDN connectivity.

These and other objects are achieved, in other aspects, by entities configured to carry out such related part(s) of such method(s), said entities including, in particular (though not exclusively): User Equipment UE, and mobile network entities such as RAN node (such as eNodeB for E-UTRAN or RNC for UTRAN), user plane CN node interfacing with RAN node (such as SGW for EPC or SGSN for GPRS/UMTS CN), control plane CN node interfacing with RAN node (such as MME for EPC or SGSN for UMTS CN), CN node interfacing with PDN (such as PGW for EPC or GGSN for GPRS/UMTS CN).

Some embodiments of apparatus and/or methods in accordance with embodiments of the present invention are now described, by way of example only, and with reference to the accompanying drawings, in which.

Figure 3:
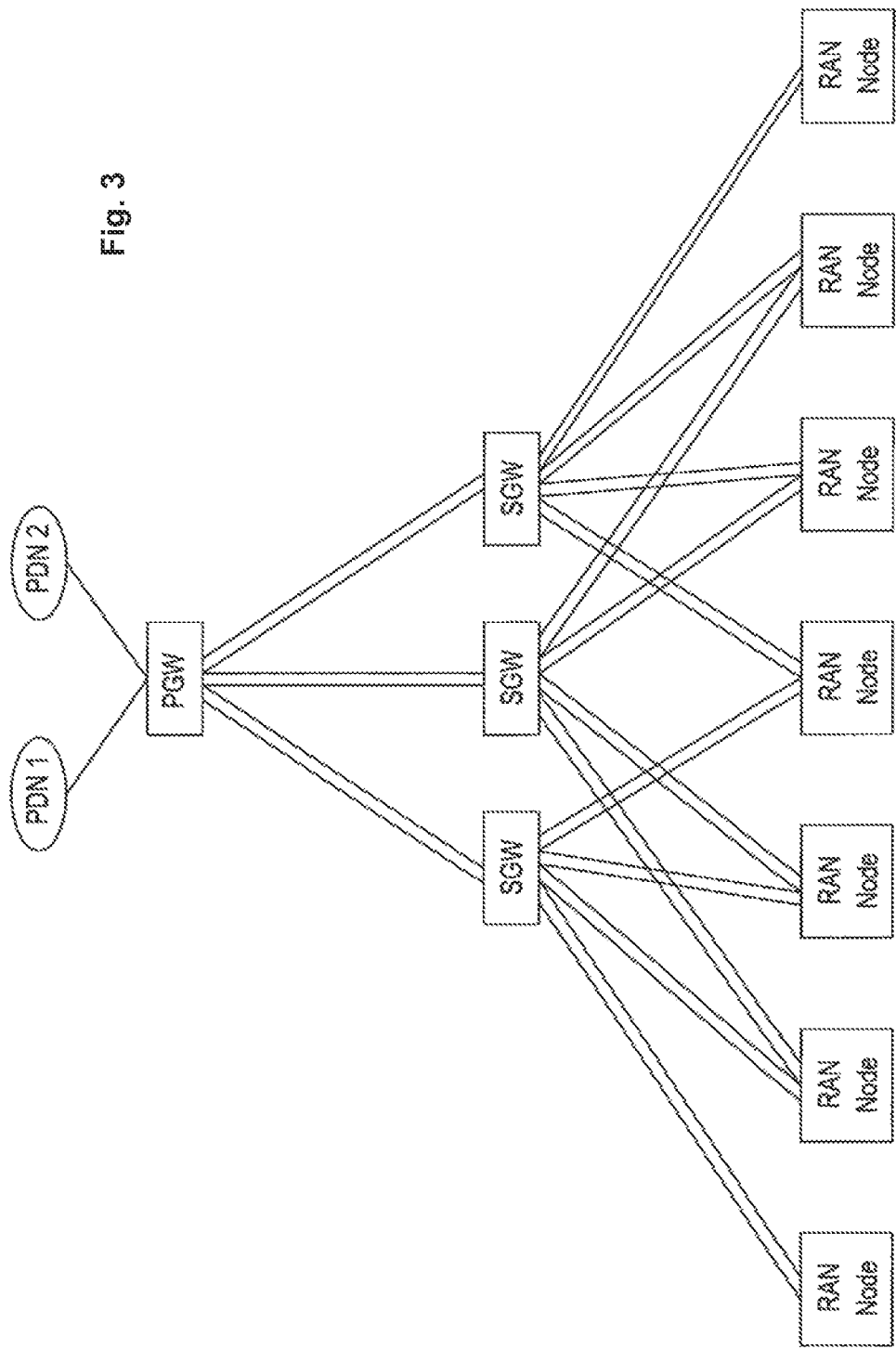
Figure 4:
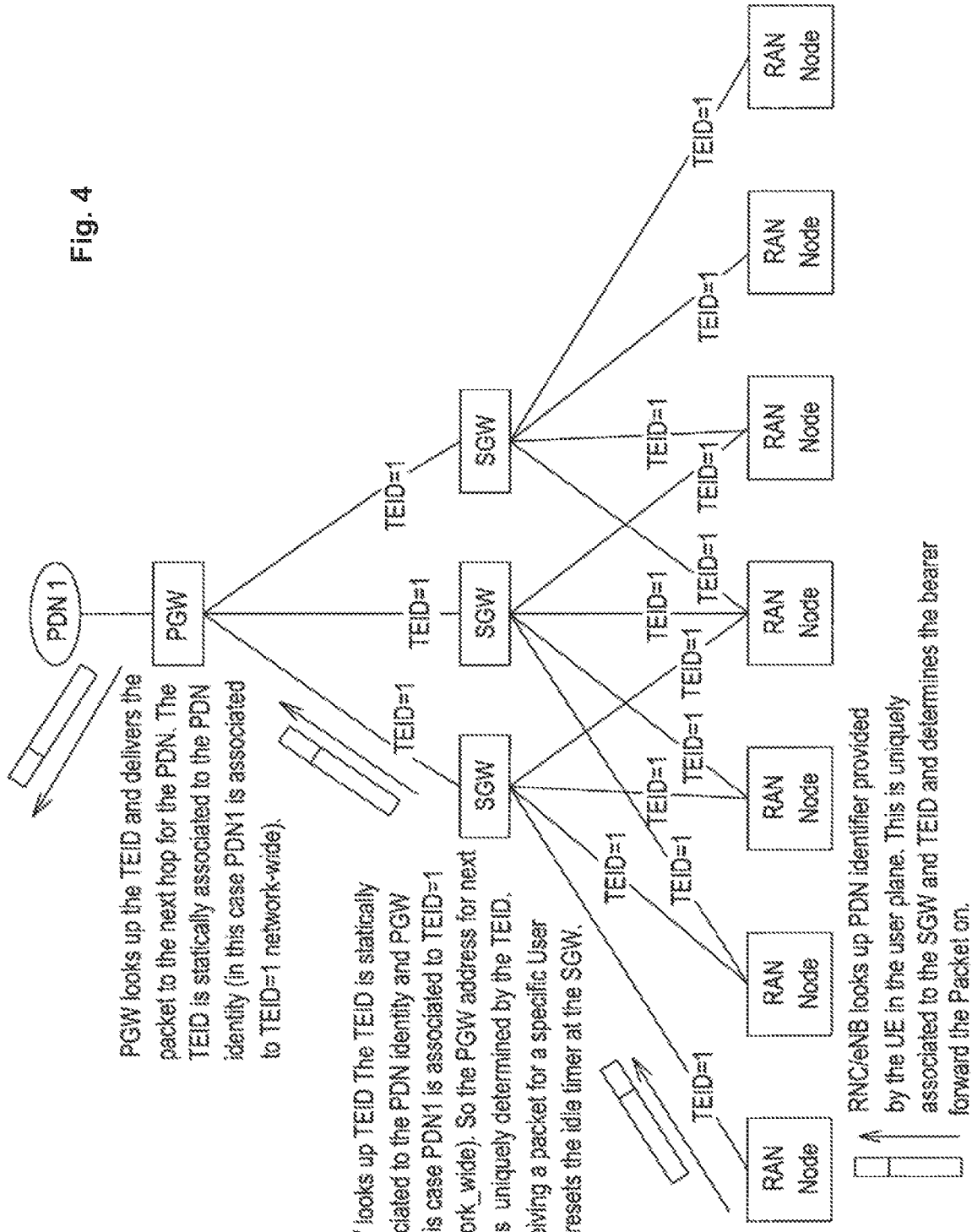
Figure 5:
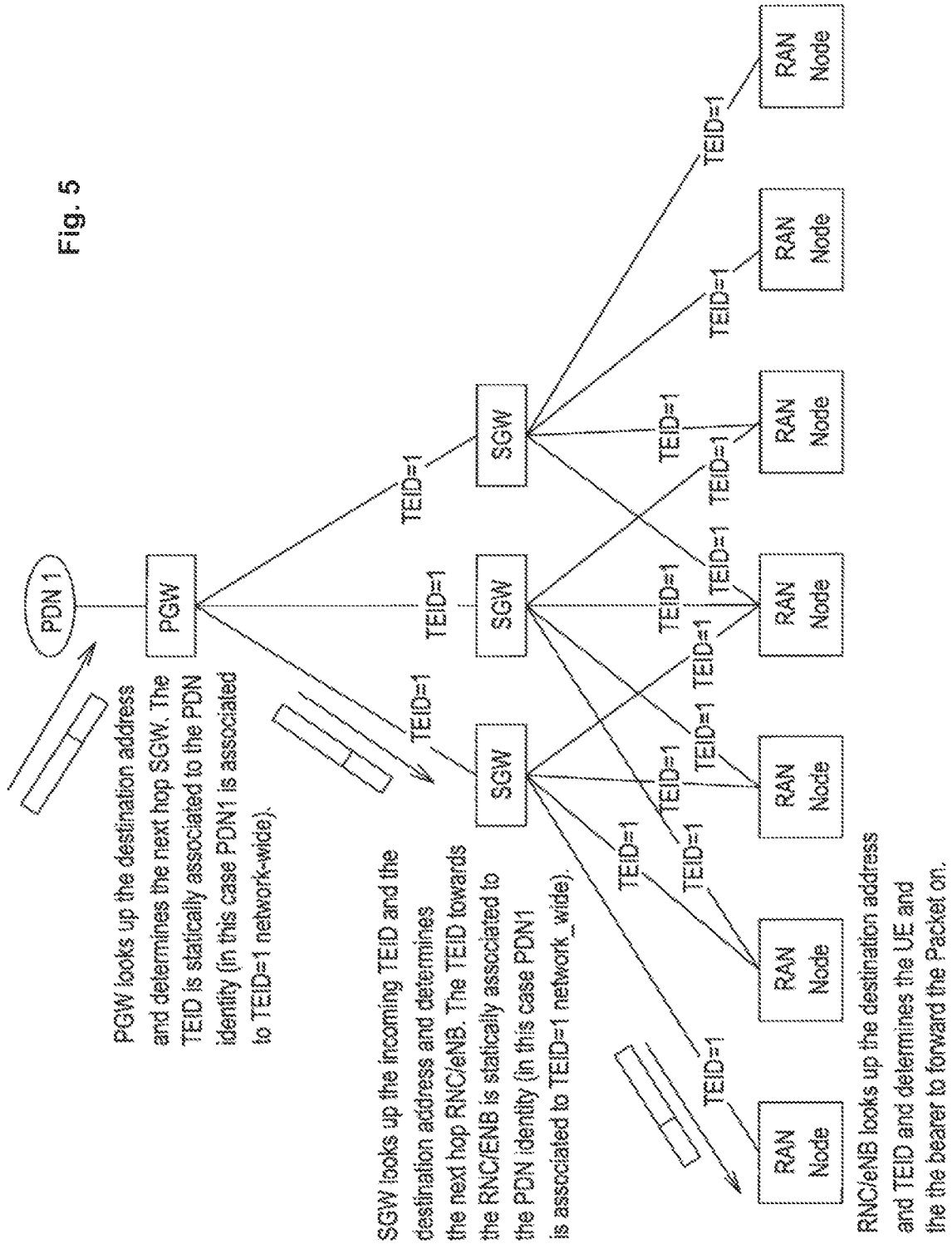
Figure 6:
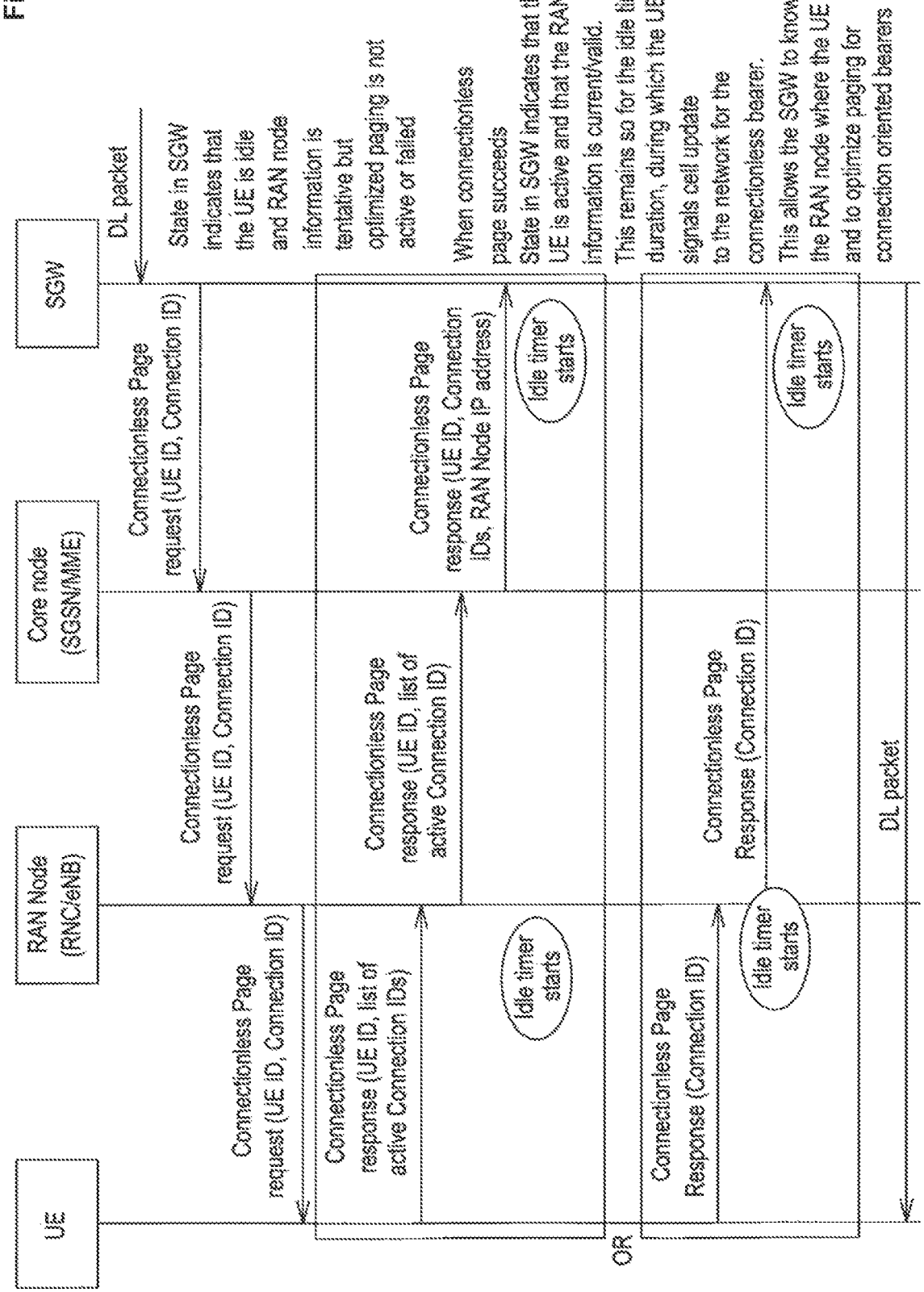
Figure 7:
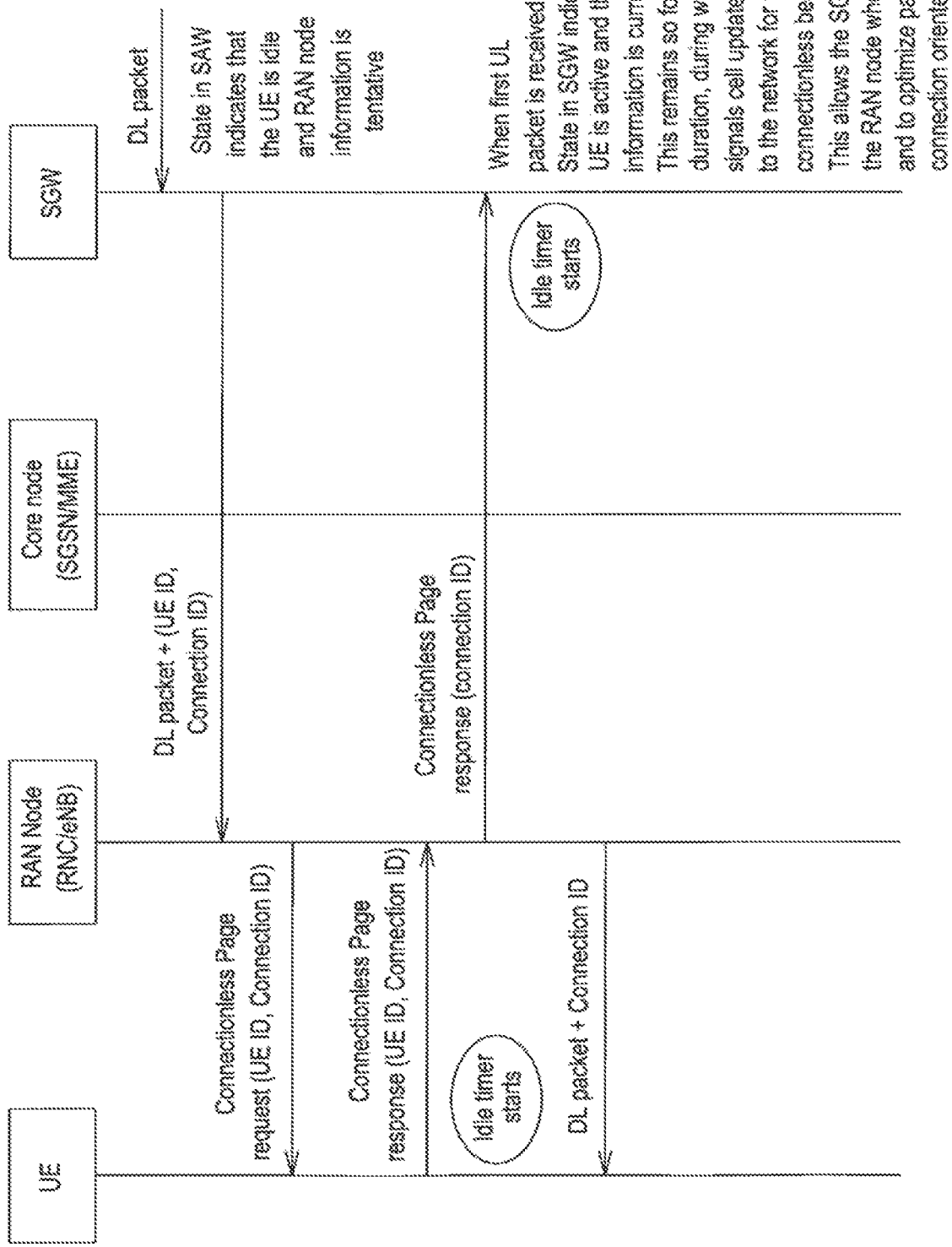
Figure 8:
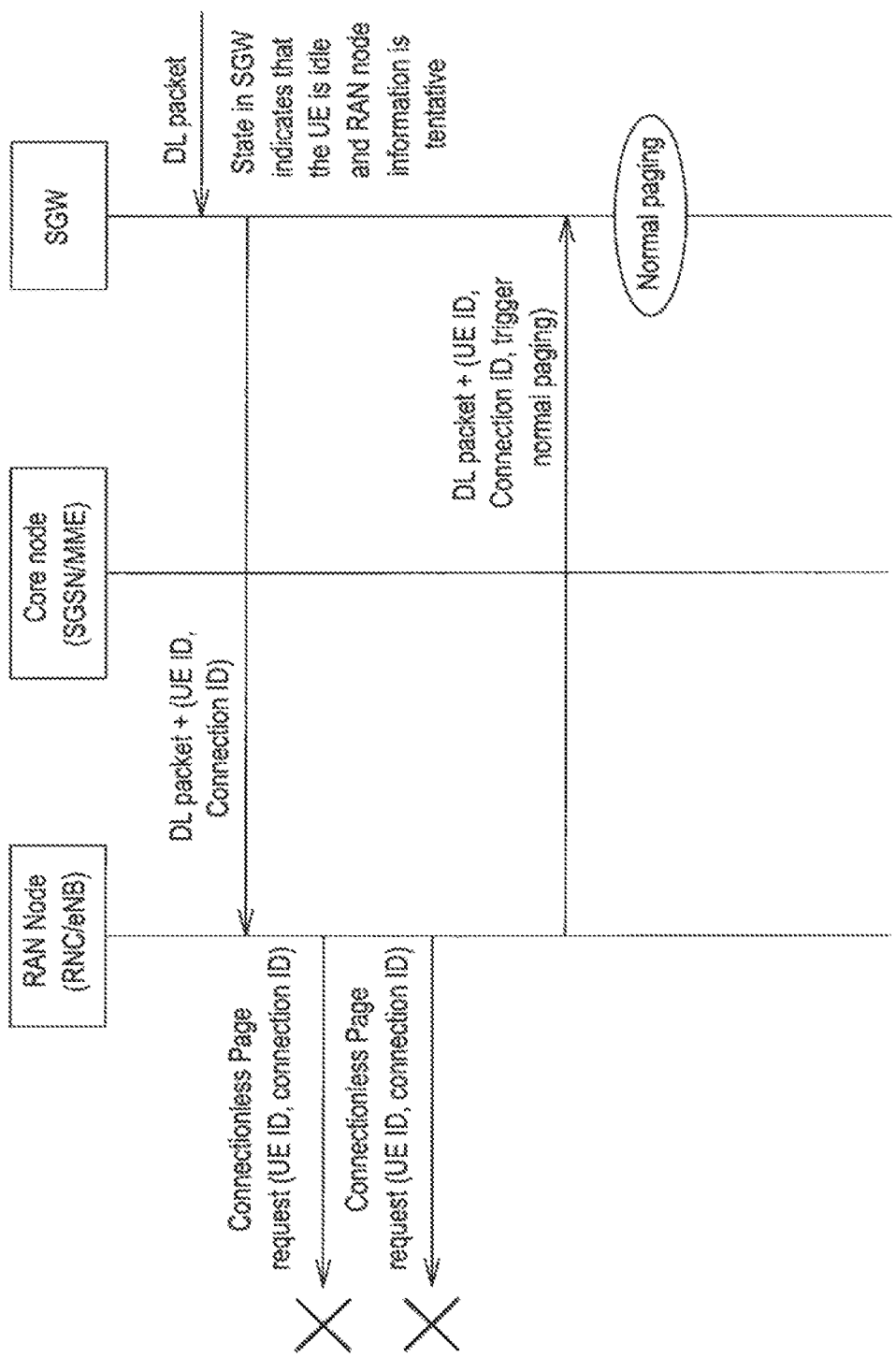
Figure 9:
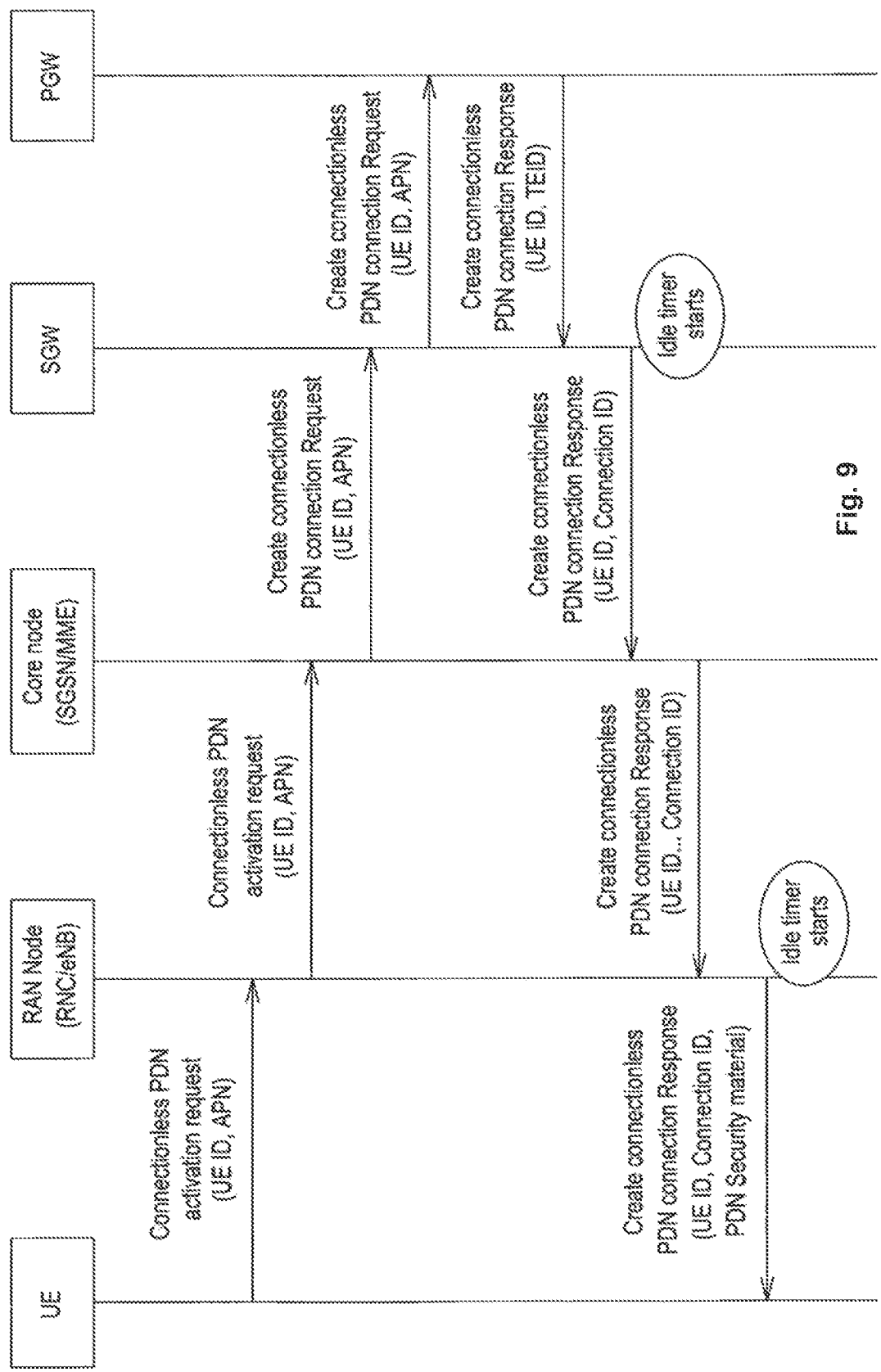
Figure 10:
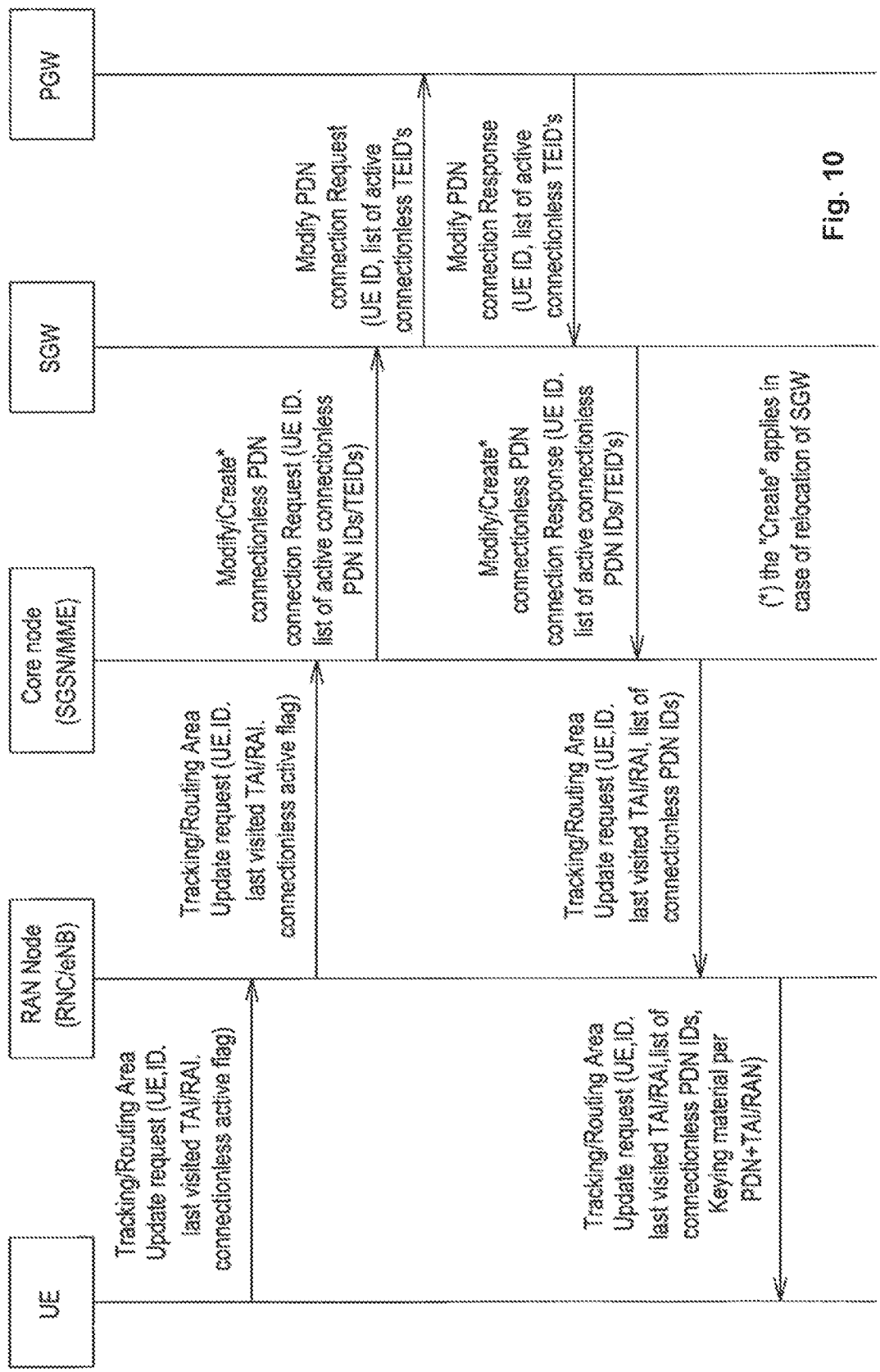

FIG. 3 is intended to illustrate, in a simplified way, an example of connectionless transmission mode in an EPS network, according to an embodiment of the present invention, FIG. 4 is intended to illustrate, in a simplified way, an example of Uplink packet forwarding in connectionless transmission mode in an EPS network, according to an embodiment of the present invention, FIG. 5 is intended to illustrate, in a simplified way, an example of Downlink packet forwarding in connectionless transmission mode in an EPS network, according to an embodiment of the present invention, FIG. 6 is intended to illustrate, in a simplified way, an example of non-optimized paging procedure in connectionless transmission mode in an EPS network, according to an embodiment of the present invention, FIG. 7 is intended to illustrate, in a simplified way, an example of optimized paging procedure in connectionless transmission mode in an EPS network, according to an embodiment of the present invention, FIG. 8 is intended to illustrate, in a simplified way, an example of a procedure in case of failure of optimized paging in connectionless transmission mode in an EPS network, according to an embodiment of the present invention, FIG. 9 is intended to illustrate, in a simplified way, an example of procedure for setting-up of PDN connection in connectionless transmission mode in an EPS network, according to an embodiment of the present invention, FIG. 10 is intended to illustrate, in a simplified way, an example of procedure for Tracking/Routing Area Update for a PDN connection in connectionless transmission mode in an EPS network, according to an embodiment of the present invention.

Figure 1:
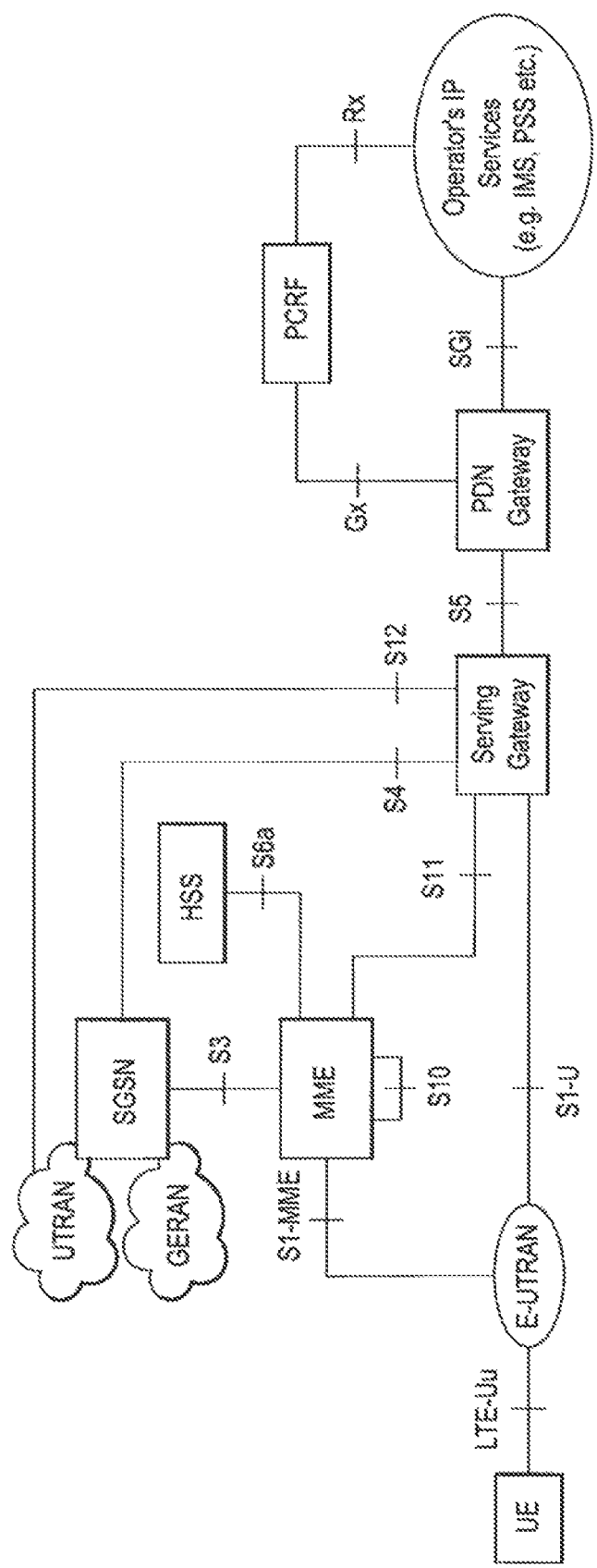
FIG. 1 is intended to recall an example of architecture for EPS network.
Figure 2:
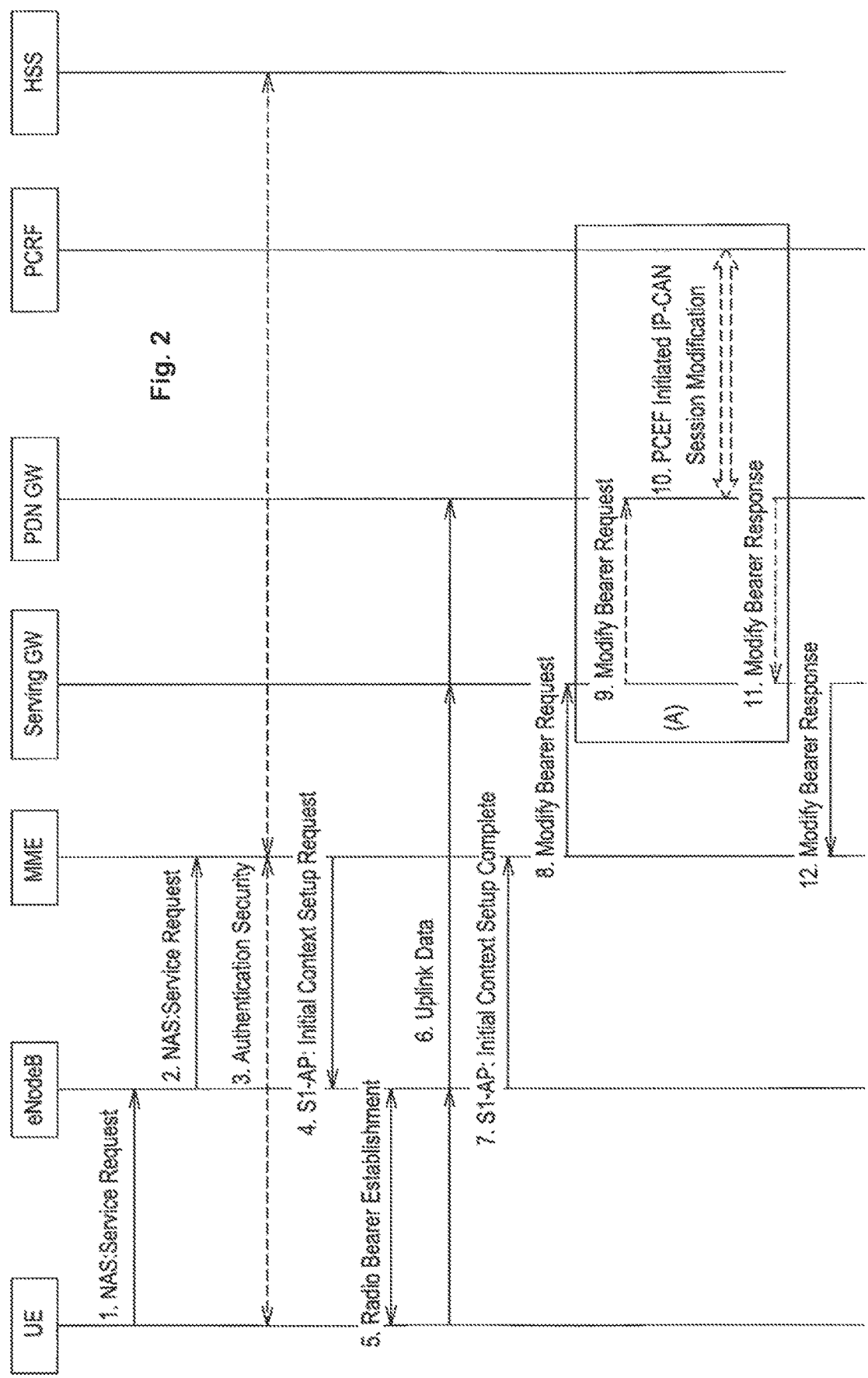
FIG. 2 is intended to recall a Service Request procedure for EPS network.

Current GPRS/UMTS and EPS assume that before any user plane data can be exchanged at least a dedicated radio data bearer over the air interface is established between the UE and the RAN, and one UE bearer tunnel using the GTP-U protocol documented in 3GPP TS 29.281 is established between the Radio Access Network and the Gateway to external networks. This bearer is established when a device exits idle state using control plane signaling documented in RANAP (3GPP TS 25.413) and GTP-C V1 (3GPP TS 29.060) for GPRS/UMTS, or S1 AP (3GPP TS 36.413) and GTP-C v2 (3GPP TS 29.274) for EPS, as recalled for example for EPS in FIG. 2 (UE triggered Service Request procedure) taken from 3GPP TS 23.401. Also, security material valid for a single UE needs to be provided to the RAN (Radio Access Network) for secure communications to be established at every transition from idle state to active state.

For applications that send small amount of data or data in a bursty mode and then are inactive for longer than the inactivity timer applied in the network to release radio resources, there is in aggregate a lot of idle to active transitions to send potentially a small amount of data, e.g. MTC device sending infrequent short packets, smartphones generating frequent small data such as keep alives.

Each idle to active transition implies a series of control plane transactions to re-establish the user plane connection through to the SGW. In many cases more radio interface and networking traffic is wasted in these control plane messages than the actual user plane message. I.e. the control plane is burdened even though the user plane is lightly loaded.

A potential solution to such problem could be to increase the idle timer so that devices stay active for longer (but this may drain battery life and still the issue may remain for deployments of very large number of devices, albeit mitigated). But also, this does not substantially help in reducing the aggregate amount of signaling produced by potentially high number of devices used in future Machine to Machine applications when these transmit small amount of data while retaining a long term connection active. Also the sheer number of devices calls for ways to reduce the amount of state kept in nodes.

Therefore, there is a need to improve the efficiency of device re-activation, i.e., to reduce the network resources needed to support device re-initiation of data transmission after a quiescent period.

In an embodiment, in order to allow a reduction of signaling needed to re-establish bearers at idle to active transitions, it is proposed to define some predefined tunnels over which to send data in connectionless mode, shared by all devices and not just dedicated to one device. This eliminates the need to maintain these tunnels per device and reduces state in nodes. This requires to keep information as to which tunnel to use to forward packets in both directions. This information can be installed using today's control plane procedures properly modified.

In an embodiment, a connectionless data transmission mode is introduced that greatly reduces signalling for re-initiating uplink and downlink data transmission for a UE in idle mode.

In an embodiment, in order to allow a reduction of signalling needed to establish bearers at idle to active transitions, it is proposed to send data in connectionless mode between the UE and the SGW along the following principles:

1. Data are sent in connectionless mode over the radio interface, and over S1-U/Iu/S12 tunnels that are predefined at PDN connection set up time. The S1-U/Iu/S12 tunnels can either be shared by all UEs using a PDN (in the cased of Shared Tunnels) or be unique per UE and PDN connection for a given SGW. This eliminates the need to establish these tunnels per UE at each idle to active transition and reduces state in nodes.
2. To send uplink data a UE needs to pass to the RAN a Connection ID the SGW has passed to the UE at PDN connection set up time, so that the RAN node can select the appropriate TEID (i.e. Tunnel Endpoint IDentifier) for uplink traffic and the appropriate SGW IP address. The Connection ID enables the RAN to derive the SGW address and, if shared tunnels are used over S1-U/Iu/S12, the uplink TEID. If a TEID per UE/PDN connection is used then the connection ID needs to pass information that uniquely identifies the UL TEID. When the Packet is sent in the UL over S1/Iu/S12 it includes information for the SGW to be able to derive the DL TEID to be used. The UL TEID identifies in the SGW the UE and the S5/S8 TEID to be used to forward traffic to the PGW.
3. Connectionless mode procedures are defined over the radio interface for allocation of radio resources to the UE and user data transmission, without the need to send a Service Request message to the MME/SGSN.
4. Security state per UE is replaced by security state per PDN connection valid for a specific tracking/routing area or set of tracking/routing areas. The UE is provided with security material at PDN connectivity set up and it is maintained during mobility management procedures. The security data is provisioned in the RAN node. This means the MME/SGSN does not need to install security material in the RAN node before sending data.
5. Multiple PDN connections can be supported concurrently. PDN connections with connectionless and connection-oriented (i.e. existing radio & S1/Iu procedures) modes may be supported concurrently.
6. Connectionless mode is applicable to UTRAN and E-UTRAN in the EPC, and can be applicable to GPRS Core.
7. An Handover procedure is not necessary in connectionless mode. When engaged in active connectionless data transmission, the UE notifies the network about cell change to enable the SGW to send downlink traffic to the RAN node serving the UE (similar to a GPRS MS in Ready State in Gb mode).
8. In a possible alternative, the RAN may retrieve from the MME/SGSN per UE security credentials or/and other parameters (e.g. UE radio capabilities) at the start of a connectionless data transmission with the UE, if not already available in the RAN, using a single request/response exchange over S1-MME/Iu.

In an embodiment:

To send uplink data a UE needs to include a PDN connection ID the SGW has passed to the UE at PDN connection set up time, so that the RAN node can select the appropriate TEID for uplink traffic and the appropriate SGW IP address. This PDN connection ID may change upon mobility management procedures when e.g. a different SGW is selected (in which case the new PN connection ID is relayed to the UE by the new SGW via the MME or SGSN). The connection ID is therefore an index of a table configured in the RAN nodes mapping it to a SGW address and a uplink TEID.

Also, security state per UE is replaced by security state per PDN connection valid for a specific tracking area or set of tracking areas. This means there is no need to establish a security context in the ENB before sending data.

When a UE sets up a PDN connectivity (PDP context in GPRS, PDN connection in EPS) for a certain APN, it may request to be handled in connectionless mode, which mean that no dedicated bearers will be possible and also that all the data will be using the same tunnels as the data of other subscribers.

This means that the RNC, eNB, SGW, PGW do no assign a TEID for user plane to the UE, but rather they simply associate the UE to a well known TEID for the connectionless support of a given PDN. It also means that any service request for dedicated bearers that today are used before any data can be transmitted, will not change the state of the connectionless PDN connectivities (so basically the service request concept does not apply to the connectionless PDN connectivities, as it should be, and connectionless and connection oriented mode operate in "ships in the night mode" from a UE and network perspective).

FIG. 3 is intended to illustrate, in a simplified way, an example of such connectionless transmission mode in an EPS network.

FIG. 3 illustrates GTP shared Tunnels for connectionless support of two PDNs (e.g. GTP-U TEID 1 could e.g. be assigned in all network statically to PDN 1 and TEID 2 to support PDN 2).

Different PDNs may be supported by allocating different Trees of statically allocated TEID's.

For simplicity all TEID's for a PDN connectivity terminated at a PGW should be the same network wide, but the solution can work also with different TEID's as long as nodes can do the mapping.

Also, one PDN may be served by multiple PDN GW's, in this case additional distributions trees can be associated to a PDN.

Multiple PDNs may be supported concurrently as all what is needed is selection of the right distribution tree for packet forwarding both DL and UL.

In an embodiment only the TEID between SGW and RAN is static, while the TEID between SGW and PGW are handled like in today system with per UE granularity.

In a embodiment the UE may also be provided with a SGW ID and and TEID to be used in the UL unique per SGW.

In an embodiment:

Data for a given PDN is secured using PDN-specific security keys valid for a specific area (e.g. for a tracking area/Routing area or set of tracking areas/routing areas). It is assumed the UE is provided with security material at PDN connectivity set up and it is maintained during mobility management procedures. The security data is provisioned in the eNB's like the connections ID's.

FIG. 9 is intended to illustrate, in a simplified way, an example of procedure for setting-up of a PDN connection in connectionless transmission mode in an EPS network, according to such embodiment.

FIG. 10 is intended to illustrate, in a simplified way, an example of procedure for Tracking/Routing Area Update for a PDN connection in connectionless transmission mode in an EPS network, according to such embodiment.

Procedures

PDN Connection Establishment

In an embodiment:

When a UE sets up a PDN connectivity for a certain APN, it is decided whether to operate in connectionless mode, which mean that no dedicated bearers will be possible, or in connection-oriented mode (i.e. existing procedure).

For connectionless mode operation, a reference to the PDN and SGW related packets sent by the UE need to be sent to, which is named Connection ID, is provided securely to the UE via NAS signaling at the connection set up and every time a SGW selection or relocation is performed.

Tracking Area Update/Routing Area Update

In an embodiment:

During TAU/RAU procedure the UE declares the existence of any connectionless PDNs and as a result the security material may be updated either because the TAI/RAI has changed or because the existing material is about to expire. Also, if as a result of the procedures the SGW relocates, a new connection ID is passed to the UE.

Uplink Traffic Handling

In an embodiment:

For uplink traffic in connectionless mode, the UE passes to the RAN the Connection ID it received during the PDN connection setup (or during the last tracking/routing area update procedure). This Connection ID implicitly identifies the SGW and the TEID to be used to send UL traffic at the eNB/RNC. The RAN should be optimized to transmit this information in the UL sparingly if sustained UL packet data transmission occurs.

The UE/bearers context information in the SGW associates the TEID used in S1-U/Iu uplink packet to a S5/S8 bearer.

An uplink packet for a connectionless mode PDN connection resets a connectionless idle timer held at the UE and SGW. While the timer is running, the UE signals cell updates to the RAN and, for cell change to a new RAN node, the new RAN node propagates the information (e.g. under the form of a dummy uplink GTP-U packet) including the information necessary in the SGW to locate the UE (e.g. RAN Node IP address). Usage of the timer in the SGW will be described in "DL traffic handling".

In an embodiment:

For the handling of Uplink traffic in connectionless mode, we need the UE to pass to the RAN a reference to the PDN and SW the packet sent by the UE needs to be sent to, which we name Connection ID. The connectionless mode may e.g. use a single per UE UL radio channel shared by all PDN connections operating in connectionless mode, or separate UL logical radio channels each for each PDN. This Connection ID implicitly identifies in this channel link layer the SGW and the TEID to be used to send UL traffic for the PDN at the ENB/RNC.

The connection ID is provided securely to the UE via NAS signaling at the connection set up and every time a SGW selection or relocation is performed, so the right SGW is selected. In a similar fashion, the state in the SGW associates the TEID used in a UL packet to an UL TEID (for instance, as illustrated in FIG. 3, TEID 1 if we assume the same TEID is used network wide for a single PDN, in this case PDN 1) and the address of the PGW handling the UE PDN connection. Basically once the eNB select the SGW and TEID via the Connection ID, it selects a unique distribution tree that routes packets to the right PGW and PDN. UL packet for a connectionless PDN resets a connectionless idle timer held at the UE, eNB and SGW so the it is assumed the eNB information is not tentative and the paging procedure is not invoked. Also, if a UE has entered a new cell and the idle timer has not expired, and the UE has no UL data to send, it will send a dummy UL radio frame the ENB then translates in a dummy UL GTP PDU including the information necessary to locate the UE in the SGW (e.g. IP address or UE ID).

When the RAN sends UL traffic it may add to the GTP header an extension header indicating the Cell ID serving the UE so that the SGW can get this information for location information retrieval purposes in the core. This is always included in the first UL PDU sent by a RAN node to the SGW for a UE when the idle timer for the UE is started in the RAN node.

FIG. 4 is intended to illustrate, in a simplified way, an example of Uplink packet forwarding in connectionless transmission mode in an EPS network, according to such embodiment.

Downlink Traffic Handling

In an embodiment:

When due to mobility the eNB or RNC change in active state, the SGW learns the IP address of the new RAN node using the information sent in the UL packets as described above. I.e. the SGW records in the UE context the address of the RAN node currently serving the UE.

Upon receipt of DL packets for a connectionless mode PDN connection, if the UE is considered active by the SGW (i.e. idle timer has not expired), the SGW sends the DL packets to the RAN node serving the UE. Otherwise, if the UE is considered idle by the SGW (i.e. idle timer has expired), the SGW may either:

invoke the network triggered service request procedure: the paging message includes a "connectionless" indication to which the UE responds by sending a cell update that updates the SGW with the RAN address. A connectionless paging does not cause the activation of all bearers in the UE, just the connectionless bearer;

as another option, an optimization based on subscription or learning of UE behaviour, could be applied for often stationary UE's: when the UE enters Idle state, the SGW marks the DL forwarding information as "tentative". When a DL packet is received, the packet is forwarded regardless to the eNB/RNC and the Connection ID and UE identity is added as an extension header to the GTP-U packet. In the event the eNB/RNC cannot deliver the packet to the UE, it shall request the SGW to page the UE via the MME/SGSN as described above and in this request may forward the data received.

In an embodiment:

When a PDN connection is created in connectionless mode, the SGW just needs to pass to the PGW selected for the PDN connection its own address in GTP-C. Say that the connectionless PDN connection is for APN 1, as illustrated for example in FIG. 3. The PGW knows that to serve PDN1 associated to APN1 it will have to send packet to this SGW on TEID 1 for a specific UE, until a modify bearer request will change this to another SGW or a delete PDN connection request will tear down the PDN connectivity. Basically host routes for the UE pointing to the right SGW are always available as long as the connectionless PDN connection is active, indicating as a next hop for DL traffic SGW IP address and TEID1

Similarly, the RNC and eNB need just to notify their own address for the SGW to be able to send downlink data to them for e.g. PDN1 associated to APN1, as TEID 1 would be used for PDN 1, as illustrated for example in FIG. 3. When, due to mobility the eNB or RNC change in active state, the SGW will just need to know the IP address of the new RNC and eNB where the UE is and this is to be done using today's procedures for relocation (triggered by TAU/RAU) or the information sent in the UL packets described above. However, the issue exists to enable the learning of the right RNC or eNB when the UE exits from IDLE state (i.e. not during an HO or relocation procedure). If this happens due to UL traffic, the SGW needs to record in its routing table a change in the host route to the UE when the UE sends UL traffic from a RNC or eNB different from the one in the current table. Basically the routing tables in the SGW are updated by learning the source address of the GTP-U packet from the RNC or eNB. If the UE exits idle state due to paging, please refer to the section related to paging In the event a UE is considered idle by the SGW, normal paging could be used and then the UE in connectionless mode would respond successfully to the paging request causing the MME/SGSN to install the next hop information in the SGW and packets to be delivered to the UE. In the paging message, if the DL packet was for a connectionless PDN, the MME/SGSN shall include the Connection ID related to the paging so that the eNB/RNC can cache the appropriate mapping when the first UL packet is received, and the UE knows for which connectionless PDN the paging is for. A Connectionless PDN paging will not cause the activation of all bearers in the UE, just the connectionless bearer.

As another option, an optimization based on subscription or learning of UE behaviour, could be applied for often stationary UE's: when the UE enters Idle state, the SGW marks the DL forwarding information as "tentative". When a DL packet is received, the packet is forwarded regardless to the eNB/RNC and the Connection ID and UE identity is added as an extension header to the GTP-U packet. In the event the eNB/RNC cannot deliver the packet to the UE, it shall request the SGW to page the UE via the MME/SGSN on a broader area and piggyback to this request the packet to be forwarded to the UE when it is updated with the correct eNB/RNC address to be used as part of the normal paging procedure. At this stage normal paging is used.

All packets received after the first DL packet at the eNB or RNC may be discarded if the optimized procedure is followed, until the first packet is successfully delivered. When optimized procedure is supported, the DL forwarding information is marked as "valid" only after the first UL packet is received from the eNB/RNC or the MME/SGSN performs a successful normal paging (if the RNC/eNB requested this if optimized paging fails). At the same time a idle timer is started which, when it elapses, causes the SGW information to be marked as tentative again.

FIG. 5 is intended to illustrate, in a simplified way, an example of Downlink packet forwarding in connectionless transmission mode in an EPS network, according to such embodiment.

FIG. 6 is intended to illustrate, in a simplified way, an example of non-optimized paging procedure in connectionless transmission mode in an EPS network, according to such embodiment.

FIG. 7 is intended to illustrate, in a simplified way, an example of optimized paging procedure in connectionless transmission mode in an EPS network, according to such embodiment.

FIG. 8 is intended to illustrate, in a simplified way, an example of procedure in case of failure of optimized paging in connectionless transmission mode in an EPS network, according to such embodiment.

In one aspect, there is provided a method for the support of data transmission in a packet mobile network, for PDN connectivity over said packet mobile network between an User Equipment UE and an external Packet Data Network PDN.

In an embodiment, said packet mobile network comprising a Core Network CN accessed by a Radio Access Network RAN, and said data transmission using a tunnel over an interface between a serving RAN node and a serving user plane CN node, said method includes support of said data transmission in a mode referred to as connectionless transmission mode, wherein said tunnel over said interface is predefined and identified using information referred to as Connection ID information, providing a reference to said PDN and to said serving user plane CN node.

In an embodiment:
said Connection ID information enables said serving RAN node to derive IP address information of said serving user plane CN node and uplink Tunnel Endpoint Identifier TEID information, without the need for extra prior signalling interaction with said user plane CN node.

In an embodiment, said method comprises a step of:
at setup of PDN connectivity, deciding whether to operate in said connectionless transmission mode for said PDN connectivity.

In an embodiment, said method comprises a step of:
at establishment of PDN connectivity in connectionless transmission mode, or at Tracking Area Update/Routing Area Update for said PDN connectivity, providing said Connection ID information via NAS signalling to the UE.

In an embodiment, said method comprises a step of:
at establishment of PDN connectivity in connectionless transmission mode, or at Tracking Area Update/Routing Area Update for said PDN connectivity, providing the UE with security material valid for a specific Tracking/Routing Area or a set of Tracking/Routing Areas.

In an embodiment, in said connectionless transmission mode:
security material is provisioned in the serving RAN node.

In an embodiment, said method comprises a step of, in said connectionless transmission mode:
the UE sending Uplink packets to said serving RAN node with said Connection ID information.

In an embodiment, said method comprises a step of, in said connectionless transmission mode:
upon reception of an Uplink packet with said Connection ID information, said serving RAN node selecting appropriate Tunnel Endpoint Identifier TEID information for Uplink traffic and appropriate IP address information of said serving user plane CN node.

In an embodiment, said method comprises a step of, in said connectionless transmission mode:
when engaged in active connectionless data transmission, said UE notifying the packet mobile network about cell change.

In an embodiment, said method comprises a step of, in said connectionless transmission mode:
the UE holding a connectionless idle timer, said idle timer being reset by the sending of an Uplink packet.

In an embodiment, said method comprises a step of, in said connectionless transmission mode:
while a connectionless idle timer held at an UE is running, the UE signalling cell updates to the packet mobile network.

In an embodiment, said method comprises a step of, in said connectionless transmission mode:
upon receiving cell change information for the UE, a new serving RAN node propagating said cell change information to said serving user plane CN node, including information necessary to locate the UE.

In an embodiment, said method comprises a step of, in said connectionless transmission mode:
said serving user plane CN node recording, in an UE context, address information of the serving RAN node currently serving the UE.

In an embodiment, said method comprises a step of, in said connectionless transmission mode:
said serving user plane CN node holding a connectionless idle timer, said idle timer being reset by the reception of an Uplink packet.

In an embodiment, said method comprises a step of, in said connectionless transmission mode:
upon receipt of a Downlink packet, if a connectionless idle timer held at said serving user plane CN node has not expired, said serving user plane CN node sending said Downlink packet to said serving RAN node currently serving said UE.

In an embodiment, said method comprises a step of, in said connectionless transmission mode:
upon receipt of a Downlink packet, if a connectionless idle timer held at said serving user plane CN node has expired, the serving user plane CN node invoking a connectionless paging procedure, including a connectionless indication for the UE in a paging message.

In an embodiment, said method comprises a step of, in said connectionless transmission mode:
upon receipt of a connectionless paging procedure, the UE signals a cell update to the packet mobile network with said Connection ID information.

In an embodiment, said method comprises a step of, in said connectionless transmission mode:
upon receipt of a Downlink packet, if a connectionless idle timer held at said user plane CN serving node has expired, the serving user plane CN node forwarding a Downlink packet regardless to the RAN node recorded in its UE context, with said Connection ID information and UE identity information.

In an embodiment, said method comprises a step of, in said connectionless transmission mode:
upon receipt of a Downlink packet with Connection ID information and UE identity information, if a RAN node is not able to deliver the packet, the RAN node requesting the serving user plane CN node to page the UE via a serving control plane CN node.

In an embodiment, in said connectionless transmission mode:
a logical traffic channel on the radio interface between UE and a serving RAN node is predefined for said PDN connectivity.

In an embodiment:
said data transmission uses a tunnel over an interface, referred to as second interface, between said serving user plane CN node and a serving CN node interfacing with said PDN, and UE/bearer context information in said serving user plane CN node associates a Tunnel Endpoint Identifier TEID used to send Uplink packets on said interface with said serving RAN node, referred to as first interface, with a bearer on said second interface.

In an embodiment:
said data transmission using a logical traffic channel over a radio interface between said UE and said packet mobile network, said method includes support of said data transmission in a mode referred to as connectionless transmission mode, wherein said logical traffic channel is predefined for said PDN connectivity.

In other aspects, there are provided entities configured for carrying out related part(s) of such method(s), said entities including, in particular (though not exclusively): User Equipment UE, and mobile network entities such as RAN node (such as eNodeB for E-UTRAN or RNC for UTRAN), user plane CN node interfacing with RAN node (such as SGW for EPC or SGSN for GPRS/UMTS CN), control plane CN node interfacing with RAN node (such as MME for EPC or SGSN for UMTS CN), CN node interfacing with PDN (such as PGW for EPC or GGSN for GPRS/UMTS CN).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A user equipment comprising:
   at least one processor; and
   at least one memory including computer program code,
   the at least one memory and the computer program code configured to, with the at least one processor, cause the user equipment at least to:
   perform a procedure to re-initiate user data transmission at transition from an idle state to an active state, said user data transmission using a tunnel over an interface between a serving radio access network entity and a serving user plane core network entity, and
   provide, within said procedure, identification information to said serving radio access network entity over a radio interface,
   wherein said serving radio access network entity is configured to select, based on said identification information, a stored uplink tunnel endpoint identifier and to forward, based on said selection, uplink data from said user equipment to said serving user plane core network entity.

2. The user equipment according to claim 1,
   wherein said user data transmission uses allocated radio resources on said radio interface,
   wherein said allocated radio resources are predefined within said procedure.

3. The user equipment according to claim 1,
   wherein said serving radio access network entity comprises an eNodeB.

4. The user equipment according to claim 1,
   wherein said serving user plane core network entity comprises a serving gateway.

5. The user equipment according to claim 1,
   wherein the at least one memory and the computer program code are configured to, with the at least one processor, cause the user equipment at least to:
   provide, within said procedure, said identification information with said uplink data to said serving radio access network entity over said radio interface.

6. The user equipment according to claim 1,
   wherein the at least one memory and the computer program code are configured to, with the at least one processor, cause the user equipment at least to:
   receive, prior to said procedure, said identification information from said serving radio access network entity over said radio interface.

7. A method of a user equipment, the method comprising:
   performing a procedure to re-initiate user data transmission at transition from an idle state to an active state, said user data transmission using a tunnel over an interface between a serving radio access network entity and a serving user plane core network entity, and
   providing, within said procedure, identification information to said serving radio access network entity over a radio interface,
   wherein, based on said identification information, said serving radio access network entity selects a stored uplink tunnel endpoint identifier and forwards, based on said selection, uplink data from said user equipment to said serving user plane core network entity.

8. The method according to claim 7,
   wherein said user data transmission uses allocated radio resources on said radio interface,
   wherein said allocated radio resources are predefined within said procedure.

9. The method according to claim 7,
   wherein said serving radio access network entity comprises an eNodeB.

10. The method according to claim 7,
    wherein said serving user plane core network entity comprises a serving gateway.

11. The method according to claim 7, the method comprising:
    providing, within said procedure, said identification information with said uplink data to said serving radio access network entity over said radio interface.

12. The method according to claim 7, the method comprising:
    receive, prior to said procedure, said identification information from said serving radio access network entity over said radio interface.

13. A radio access network entity comprising:
    at least one processor; and
    at least one memory including computer program code,
    the at least one memory and the computer program code configured to, with the at least one processor, cause the radio access network entity at least to:
    perform a procedure to re-initiate user data transmission at transition from an idle state to an active state, said user data transmission using a tunnel over an interface between the radio access network entity and a serving user plane core network entity,
    receive, within said procedure, identification information from a user equipment over a radio interface,
    select, based on the identification information, an uplink tunnel endpoint identifier from said at least one memory, and
    forward, based on the selection, uplink data from said user equipment to said serving user plane core network entity.

14. The radio access network entity according to claim 13,
    wherein said user data transmission uses allocated radio resources on said radio interface,
    wherein said allocated radio resources are predefined within said procedure.

15. The radio access network entity according to claim 13,
    wherein said radio access network entity comprises an eNodeB.

16. The radio access network entity according to claim 13, wherein said serving user plane core network entity comprises a serving gateway.

17. The radio access network entity according to claim 13, wherein the at least one memory and the computer program code are configured to, with the at least one processor, cause the radio network entity at least to:
receive, within said procedure, said identification information with said uplink data from said user equipment over said radio interface.

18. The radio access network entity according to claim 13, wherein the at least one memory and the computer program code are configured to, with the at least one processor, cause the radio access network entity at least to:
provide, prior to said procedure, said identification information to said user equipment over said radio interface.

19. A radio access network entity method comprising:
performing a procedure to re-initiate user data transmission at transition from an idle state to an active state, said user data transmission using a tunnel over an interface between a radio access network entity and a serving user plane core network entity;
receiving, within said procedure, identification information from a user equipment over a radio interface;
selecting, based on the identification information, an uplink tunnel endpoint identifier stored in said serving radio access network entity; and,
forwarding, based on the selection, uplink data from said user equipment to said serving user plane core network entity.

* * * * *